United States Patent [19]

Spedden et al.

[11] 3,723,598

[45] Mar. 27, 1973

[54] DRY CYCLIC PROCESS UTILIZING A MANGANOUS OXIDE ABSORBENT FOR REMOVAL OF DILUTE SULFUR VALUES FROM GAS STREAMS

[75] Inventors: Henry Rush Spedden; Kenneth J. Richards; William J. Schlitt, III, all of Salt Lake City, Utah

[73] Assignee: Kennecott Copper Corporation, New York, N.Y.

[22] Filed: Nov. 5, 1970

[21] Appl. No.: 87,089

[52] U.S. Cl. .................................................423/244
[51] Int. Cl. .........................C01b 17/56, C01b 17/60
[58] Field of Search ........23/178, 178 S, 25; 423/244

[56] References Cited

UNITED STATES PATENTS

| | | | |
|---|---|---|---|
| 2,824,047 | 2/1958 | Gorin et al. | 23/3 L |
| 2,984,545 | 5/1961 | Tarbutton et al. | 23/178 R |
| 3,150,923 | 9/1964 | Bienstock et al. | 23/178 F |
| 3,330,096 | 7/1967 | Zimmerly | 23/25 |
| 3,411,865 | 11/1968 | Pijpers et al. | 23/178 R X |
| 3,492,083 | 1/1970 | Lowicki et al. | 23/178 R X |
| 3,501,897 | 3/1970 | VanHelden et al. | 23/178 R X |

OTHER PUBLICATIONS

Jacobson, Encyclopedia of Chemical Reactions, volume 4, page 500 (Reinhold – 1951)

Primary Examiner—Oscar R. Vertiz
Assistant Examiner—Charles B. Rodman
Attorney—John L. Sniado, Mallinckrodt and Cornaby and Philip A. Mallinckrodt

[57] ABSTRACT

Manganous oxide is utilized as a dry absorbent for dilute sulfur values, such as $SO_2$ and $SO_3$, in a gas stream of the nature of waste effluent from industrial stacks of smelters, power plants, etc. The resulting manganese sulfate is regenerated to provide dry manganous oxide for recycling to the gas stream. Regeneration is effected by dry calcination of the manganese sulfate under reducing conditions.

8 Claims, 3 Drawing Figures

DRY CYCLIC PROCESS UTILIZING A MANGANOUS OXIDE ABSORBENT FOR REMOVAL OF DILUTE SULFUR VALUES FROM GAS STREAMS

BACKGROUND OF THE INVENTION

1. Field

The invention belongs to that class of known processes concerned with the removal of dilute sulfur values from waste industrial gases, particularly effluent stack gases that tend to contaminate the atmosphere. Thus, this invention is directly concerned with current efforts to safeguard the environment against air pollution.

2. State of the Art

Considerable work has been done heretofore in the general field concerned, and manganese oxides have long been recognized as effective absorbents for sulfur values of the nature of and in the same dilute concentrations as with the present invention. However, the oxides of higher valence ($MnO_2$ and $Mn_2O_3$) have been favored, and no dry cyclic process has been developed nor a process having the economic and procedural advantages of the present process. A dry process has the advantage that absorption can be accomplished without cooling the effluent gases concerned. Consequently, they rise rapidly into the upper atmosphere and are effectively dissipated. Effluent gases treated by wet processes are cooled and tend to hover near ground level, rather than to rise.

OBJECTIVES

In the making of the invention, it was an objective to provide an effective and economical process for removing such sulfur values as $SO_2$ and $SO_3$ from flue gases in which they occur in dilute quantity, whereby air pollution is reduced to a minimum and it becomes possible to also achieve economic benefits by recovery of the sulfur values. A further objective was to provide a dry, cyclic process wherein a manganese oxide material is used as a sulfur absorbent and is regenerated and reused periodically.

BRIEF SUMMARY OF THE INVENTION

In achieving the objectives of this invention an important feature is the use of manganous oxide (MnO) as an absorbent for the dilute $SO_2$ and $SO_3$ present in the gas stream undergoing treatment. Heretofore, other manganese oxides have been favored for this purpose, especially manganese dioxide ($MnO_2$), but we have found that manganous oxide (MnO) is an excellent absorbent at the relatively low temperatures normally prevailing in effluent stack gases, (100°C.–400°C.) and is amenable to quick, easy, and economical regeneration in a completely dry state by calcination under reducing conditions. Regeneration is easily accomplished by calcining the spent manganous oxide absorbent (manganese sulfate) in the presence of a reducing agent, such as a carbonaceous material or hydrogen gas. Following regeneration from the sulfate back to manganous oxide, the regenerated absorbent material is recycled to the gas absorption stage for reuse. The entire process is dry, easily handled, economical, and effective.

Normally, a readily obtainable and inexpensive material containing manganese values in oxidized or oxidizable form, e.g. manganese oxide or carbonate ores of various kinds, will be used initially as the feed material. If the manganese values are not already in manganous oxide form, such material should be fed first to the regeneration stage to place such values in the required manganous form. If these manganese values in the initial feed material are already in manganous form, such feed material is preferably fed directly to the absorption stage. Sea nodules are normally high in manganese oxide values and have been found to be particularly amenable to the regeneration procedure of the present process. As such, they are a preferred feed material in crushed or pelletized form.

When solid carbon, such as coal, is used as the reducing agent during the calcining stage of the process, concentrated $SO_2$ can be recovered for production of sulfuric acid. If gaseous hydrogen or a hydrocarbon gas is used as the reducing agent, either concentrated $SO_2$ or $H_2S$ can be recovered for acid or elemental sulfur production, depending on conditions.

THE DRAWING

In the accompanying drawing, which is illustrative of the invention:

FIG. 1 is a flow sheet showing the process from a general procedural standpoint;

FIG. 2, a graph showing comparative absorptions by various manganese oxides of $SO_2$ from a dry gaseous atmosphere at low temperatures and containing $SO_2$ to an extent typical of many effluent stack gases; and FIG. 3, a similar graph but with respect to an $SO_2$ atmosphere containing moisture to an extent typical of various other effluent stack gases.

DETAILED DESCRIPTION OF PREFERRED PROCEDURES

Figure 1:
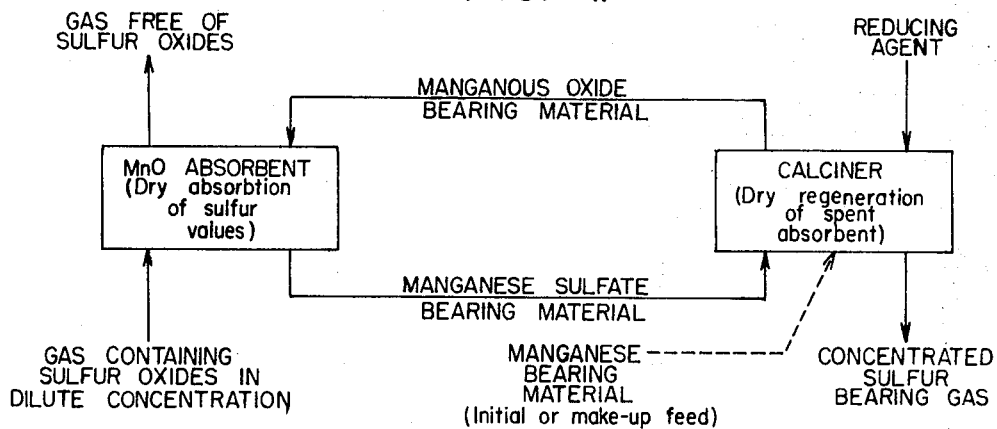

The generalized flow sheet of FIG. 1 is representative of the best mode presently contemplated for carrying out the process of the invention, and the several examples herebelow are illustrative of specific applications of the process in accordance with such flow sheet.

Manganous oxide, preferably in dry pulverulent state, is utilized as the absorbent for dilute sulfur values carried by a gas stream. Ordinarily the sulfur values will be $SO_2$ or $SO_3$ gas intermingled with other effluent gases emanating from flues of industrial furnaces or processing equipment of smelters, chemical plants, power plants, and the like, which have in the past been discharged into the atmosphere as waste stack gases. Any suitable apparatus normally used under similar conditions may be employed for maintaining a fluid bed of the particles of manganous oxide in the path of flow of the effluent gas. This is presently regarded as a preferred way of accomplishing contact between the solid particles of absorbent and the gas, but a variety of other ways known to the art may be employed. For example, the effluent gas may be passed through a tower containing granules of ore or other manganous-oxide-bearing material.

When the manganous oxide absorbent is effectively spent, i.e. when enough has reacted with sulfur values to form sufficient manganese sulfate to justify regeneration, it is passed to a regeneration stage for conversion of the manganese sulfate back to manganous oxide and is then recycled to the sulfur-absorption phase of the process. The extent of sulfate formation prior to regeneration is not critical and is, in fact, primarily a matter of economics in any given instance. For example, conversion of 5 percent could be sufficient to justify regeneration.

Regeneration is preferably accomplished in calcining apparatus of known type, but one in which the atmosphere can be controlled to yield reducing conditions. Thus, an ordinary rotary kiln may be employed if provision is made to continuously sweep the interior with a flow of an inert or reducing gas, such as nitrogen or carbon monoxide. When such gas is not itself a reducing agent, the spent absorbent, i.e. reactant, (manganese sulfate with unreacted manganous oxide) is mixed with a reductant, such as coal or other solid hydrocarbon, to establish reducing conditions, and the mixture is subjected to a calcining temperature for a period of time sufficient to accomplish the desired regeneration. When hydrogen or natural gas is used as a reductant, a calcining furnace in which air is positively excluded must be employed, as will be apparent to those skilled in the art.

A gas containing concentrated amounts of sulfur values is obtained as a by-product of the calcining operation and may be used for the manufacture of sulfuric acid, etc. This provides an economic basis for industrial application of the process.

Only rarely will the material used as the absorbent contain manganese values in the form of manganous oxide, so as to be initially usable in the sulfur absorption stage of the process. Normally, a relatively inexpensive material containing manganese oxide or carbonate values, such as a manganese ore or, preferably, deep sea nodules, will be utilized in crushed or finely ground form as feed directly to the regeneration stage. Calcination of such material under the reducing conditions indicated will produce a manganous oxide material for passing to the absorption stage.

Figure 2:
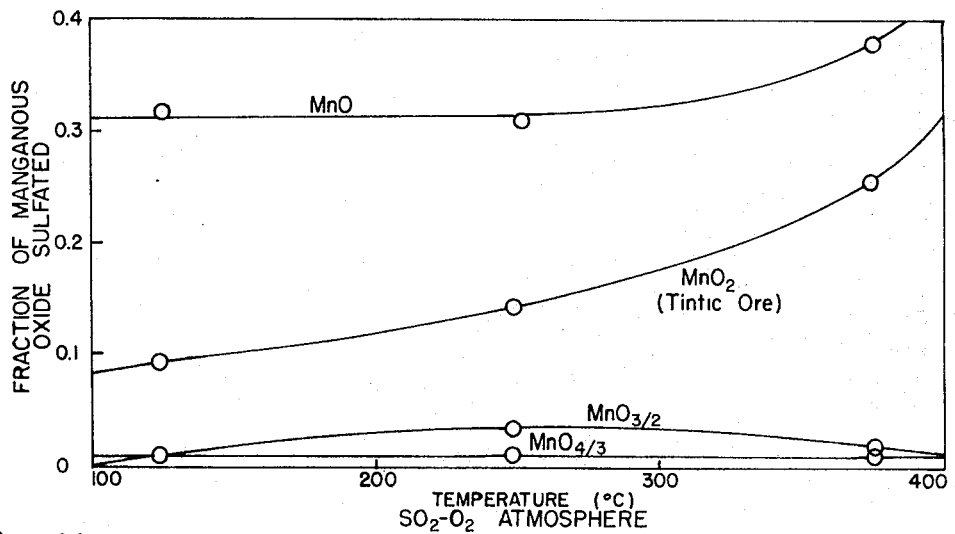
Figure 3:
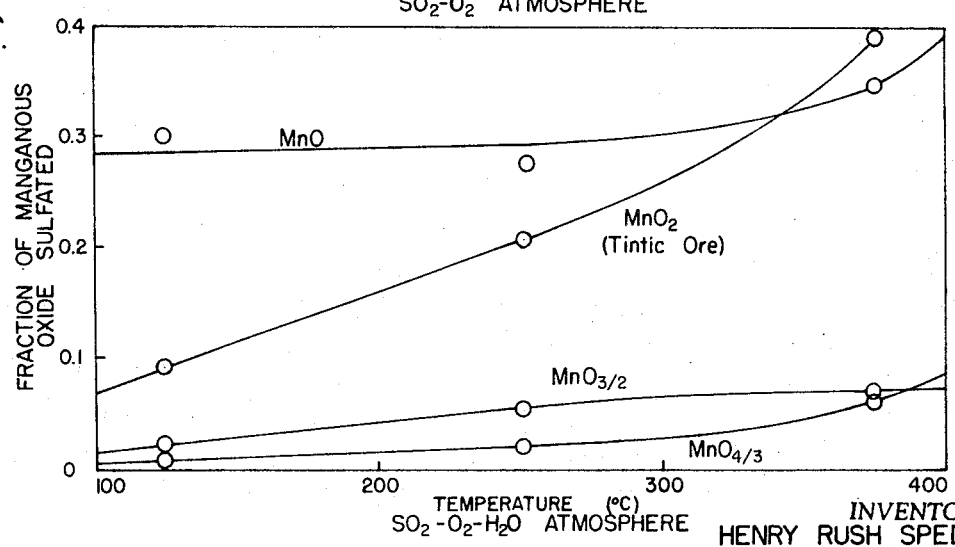

We have found that the manganous oxide absorbent is considerably more effective in the low temperature range normal for effluent flue gases than are the higher oxides of manganese. This is true whether the gases concerned are dry or wet. FIGS. 2 and 3 are graphs typical of laboratory tests carried out by us.

Specific examples of the process of the invention carried out with respect to various feed materials and under various conditions are reported below:

EXAMPLE 1

High purity (reagent grade) manganese sulfate $MnSO_4$ was used as a feed material in the regeneration stage of the cyclic process. Reducing conditions were established by combining the sulfate with granulated charcoal and heating the mixture to 950°C in a system from which air was excluded by providing a slowly flowing nitrogen atmosphere. Decomposition of the sulfate to form MnO and evolve the sulfur as $SO_2$ was complete after 10 minutes. When regeneration was repeated at lower temperatures, longer times were required, e.g. 30 minutes were needed at 750°C.

The essentially pure manganous oxide produced under these reducing conditions was then fed to the absorption stage. Here the powdered oxide (100 to 200 mesh) was injected into a gas representative of smelter stack gases. The gas composition was, on the average, 1 percent $SO_2$ by volume, the balance being comprised of nitrogen, oxygen, carbon dioxide and water vapor. The MnO reacted rapidly and completely with all $SO_2$ present in the gas until a sulfur loading of 8 to 10 percent by weight was reached. At this point there was a noticeable decrease in absorption efficiency. The absorption was essentially independent of temperature in the range of 125° to 375°C.

The sulfated manganous oxide was then returned to the regeneration stage where pure MnO absorbent was reformed as the sulfur was driven off as concentrated $SO_2$ in the nitrogen gas stream. The regenerated manganous oxide product again absorbed about 8 to 10 percent sulfur when exposed to the $SO_2$-bearing gas in the absorption stage.

EXAMPLE 2

In this demonstration of the invention, the solid carbonaceous reducing agent and nitrogen used in the regeneration stage of the process were replaced by various reductant gases. Different trials were made using carbon monoxide, hydrogen, and natural gas, respectively. At 950°C., none of these reductants promoted rates of sulfate decomposition and MnO production as high as those obtained with solid carbon. However, the decrease in the rate of MnO formation with falling temperature was less for hydrogen than for the carbonaceous solid reducing agent. Thus, MnO could be produced rapidly at temperatures as low as 650°C. when hydrogen gas was used.

When essentially pure MnO, which was produced using the gaseous reducing agents, was contacted with the $SO_2$-bearing gas in the absorption stage, sulfur loadings of 8 to 10 percent were again achieved before there was a noticeable drop in the efficiency of sulfur dioxide removal. Thus, it is clear that any reducing agent may be used in the regeneration stage if sufficiently long times and high temperatures are employed so that formation of MnO progresses to completion.

EXAMPLE 3

High Purity $Mn_3O_4$ (representative of the mineral Hausmannite), was used in place of manganese sulfate as feed material in the regeneration stage in this demonstration of the invention. The higher valent oxide was reduced to the desired manganous form by treating with hydrogen at 850°C. for 20 minutes.

When the powdered MnO so produced was injected into the $SO_2$-bearing gas under the same conditions as noted for Example 1, the absorption of $SO_2$ continued quantitatively until sulfur loadings of about 8 percent were achieved. At this point there was an accelerating decrease in the efficiency of the $SO_2$ pickup. Thus when these results are compared with those of Examples 1 and 2, the form of the feed to the regeneration stage is seen to be unimportant if the material can be completely reduced to MnO.

EXAMPLE 4

In this demonstration of the invention a low-grade manganese ore, typical of those which cannot be worked profitably to recover metal values, was used as feed material in the regeneration stage of the process. The crushed and ground ore had the following analysis:

| Element | Percent |
|---|---|
| Manganese | 31 |
| Iron | 10 |
| Lead | 2.5 |
| Zinc | 5.5 |

In addition, the ore contained substantial amounts of silicon, aluminum, calcium, and magnesium values in the form of oxides and silicates, as well as lesser amounts of other elements, such as silver, the halogens, sulfur, and alkali metals. The manganese was initially present primarily as mixed oxides of valence higher than desirable.

Hydrogen gas was used as the reducing agent for regeneration. Conversion to MnO was achieved in 20 minutes at 850°C. Upon transfer of the manganous oxide-bearing material to the $SO_2$ absorption stage, the MnO was contacted with a gas containing $SO_2$ as described in the previous examples. At a temperature of 250°C., the available $SO_2$ was completely absorbed until a sulfur loading of 3 to 6 percent by weight was reached. At this point a decrease in $SO_2$ absorption efficiency became apparent. Recycling the sulfur-laden absorbent to the regeneration stage permitted recovery of the sulfur in concentrated form, primarily as $SO_2$. Using hydrogen gas as a reducing agent at 850°C, about 30 minutes were required for complete desulfurization and conversion of the manganese to the desired manganous oxide form. This regeneration absorbent was then contacted with the $SO_2$-bearing gas again, and the oxide was found to retain its ability to absorb $SO_2$.

EXAMPLE 5

All examples cited above involve small scale tests in which MnO regeneration and $SO_2$ absorption were carried out in externally heated tube furnaces capable of operation under controlled atmospheres. In a variation of the tests utilizing the ore, regeneration was carried out in an externally fired rotary calciner operating at 650°C., with flowing natural gas serving as the reductant. The retention time of solids in the furnace was 45 minutes, and the sulfur level of the absorbent was reduced to about 1 percent. The majority of the manganese was converted to MnO. The regenerated absorbent was then fed to a 4-inch diameter fluid bed maintained at 185°C. Here the MnO was reacted with gas flowing at 8.3 cfm and having an analysis which corresponds closely to waste gas from reverberatory furnace smelting of copper, namely:

| Gas | Percent |
|---|---|
| Air | 79.6 |
| $SO_2$ | 0.8 |
| $CO_2$ | 1.8 |
| Water Vapor | 17.8 |

The feed rate of MnO-bearing ore to the bed was 0.09 pounds per minute, and 88 percent of the $SO_2$ in the gas was absorbed. Sulfur loading of the discharged absorbent ranged from 2 to 7 percent.

In a variation of this process, 100 cfm of gas containing 1.1 percent $SO_2$ and 0.1 percent $SO_3$ was withdrawn from a smelter flue system. Finely ground ore was injected into the gas and was removed 100 feet down stream. During this contact between the gas and the ore, better than 99 percent of the $SO_2$ and $SO_3$ were removed. Sulfur pickup by the absorbent ranged from 1.5 to 3.0 percent and increased as the particle size decreased.

EXAMPLE 6

Another demonstration of the invention was provided by taking the crushed and ground ore and pelletizing it to provide the absorbent in a fixed bed process for $SO_2$ recovery. The average physical properties of the pellets were as follows:

| Size | ¼ inch diameter |
|---|---|
| Porosity | 43 percent |
| Bulk Density | 2.4 grams/cc |
| Specific Gravity | 4.2 |
| Crushing Strength | 75 pounds/pellet |

The chemical composition was similar to that given in Example 4, except that some of the lead and zinc was driven off during pelletizing. Thus the manganese content of the pellets was increased to 35 percent.

The pellets so produced were loosely packed in a column to form a fixed bed containing only 325 grams of absorbent. AFter 10 cycles of regeneration and $SO_2$ absorption, the following results were observed. First, desulfurization and formation of the desired MnO was achieved by flowing hydrogen through the bed for 1 hour at 600°C. The bed was cooled to 400°C., and a gas stream was introduced which contained 1 percent $SO_2$, 17 percent water vapor, and the balance air. The hourly space velocity of the gas was 1400 (volume of gas per hour/volume of absorbent bed). Complete absorption of the $SO_2$ continued for 48 minutes. At that point there was a perceptible drop in $SO_2$ absorption.

EXAMPLE 7

In yet another demonstration of the invention, the porous pellets of manganese ore were replaced with similar pellets made from crushed and ground manganese-bearing deep sea nodules. The chemical analysis of a typical nodule is as follows:

| Element | Percent |
|---|---|
| Manganese | 25 |
| Iron | 10 |
| Nickel | 1.1 |
| Copper | 0.7 |
| Cobalt | 0.1 | together with substantial amounts of clay-like material, comprised of calcium and magnesium oxides and alumina and silica, and minor amounts of other materials, such as the halogens and alkali metals. Manganese was present initially as the hydrated oxides of higher valence.

The pelletized material was placed in a bed as described in Example 6. Regeneration was carried out with flowing hydrogen as the reductant at 900°C. Time for regeneration was 30 minutes. The bed was then in the desired manganous oxide form and was cooled to 350°C. whereupon a gas containing 1 percent $SO_2$, 17 percent water vapor, and the balance a mixture of oxygen, nitrogen, and carbon dioxide was introduced at an hourly space velocity of 425. The absorption of $SO_2$ by the pellets proceded at 100 percent efficiency for the first 3 hours, after which there was an almost imperceptible decrease in absorption efficiency. After 7.5 hours, absorption efficiency was still above 83 percent.

Whereas this invention is here illustrated and described with respect to certain preferred procedures thereof, it is to be understood that many variations are possible without departing from the inventive concepts particularly pointed out in the claims.

We claim:

1. A dry, cyclic process for removing dilute sulfur oxides from an effluent stack gas stream containing said oxides, comprising contacting a manganous oxide reactant in substantially dry condition with the gas stream in the presence of available oxygen to extract sulfur oxides from said gas stream, whereby the manganous oxide contacted by the gas reacts with said sulfur oxides to form manganese sulfate; discontinuing said contacting when the sulfur-extracting action of said reactant is effectively spent, and subjecting said reactant to calcination under reducing conditions, whereby the sulfur values are volatilized and manganous oxide is regenerated from the manganese sulfate: resuming said contacting with respect to the regenerated manganous oxide as the reactant; and continuing the foregoing steps on a cyclic basis.

2. A process according to claim 1, wherein the manganous oxide reactant is formed initially from a manganese-bearing material in which the manganese values are in a form capable of conversion to manganous oxide by calcination under reducing conditions, said material being fed directly to the regeneration stage of the process.

3. A process according to claim 2, wherein the manganese-bearing material is a manganese ore.

4. A process according to claim 2, wherein the manganese-bearing material is made up of deep sea nodules.

5. A process according to claim 1, wherein make-up quantities of the manganous oxide reactant are provided from time to time by feeding directly to the regeneration stage of the process a manganese-bearing material in which the manganese values are in a form capable of conversion to manganous oxide by calcination under reducing conditions.

6. A process according to claim 1, wherein the reducing conditions during regeneration are provided by mixing a solid carbonaceous reducing agent with the spent reductant from the sulfur extracting stage prior to calcination thereof.

7. A process according to claim 1, wherein the reducing conditions are provided by maintaining a gaseous reducing atmosphere during calcination.

8. A process according to claim 1, wherein the effluent gases during the calcination stage are recovered and processed for their sulfur content.

* * * * *